(12) United States Patent
Chennupati et al.

(10) Patent No.: US 11,936,983 B1
(45) Date of Patent: Mar. 19, 2024

(54) SHOCK LIMITERS AND DAMPERS FOR IMPROVED CAMERA RELIABILITY

(71) Applicant: Apple Inc., Cupertino, CA (US)

(72) Inventors: Nitin Kumar Chennupati, Mountain View, CA (US); Nicholas D. Smyth, San Jose, CA (US); Justin C. Brunnett, San Ramon, CA (US); Hiran R. Rathnasinghe, Lemon Grove, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/951,676

(22) Filed: Sep. 23, 2022

(51) Int. Cl.
    *H04N 23/68* (2023.01)
    *G03B 5/02* (2021.01)
    *H04N 23/54* (2023.01)
    *H04N 23/55* (2023.01)

(52) U.S. Cl.
    CPC ............. *H04N 23/686* (2023.01); *G03B 5/02* (2013.01); *H04N 23/54* (2023.01); *H04N 23/55* (2023.01); *G03B 2205/0069* (2013.01)

(58) Field of Classification Search
    CPC ...... H04N 23/686; H04N 23/54; H04N 23/55; G03B 5/02; G03B 2205/0069
    USPC ...................................................... 348/208.8
    See application file for complete search history.

(56) References Cited

U.S. PATENT DOCUMENTS

| | | | |
|---|---|---|---|
| 9,766,532 B2 | 9/2017 | Park et al. | |
| 10,317,649 B2 | 6/2019 | Sharma et al. | |
| 10,969,652 B2 | 4/2021 | Miller et al. | |
| 11,092,773 B2 | 8/2021 | Smyth et al. | |
| 11,243,455 B2 | 2/2022 | Mireault et al. | |
| 11,314,147 B1* | 4/2022 | Sharma | H04N 23/54 |
| 11,363,203 B2* | 6/2022 | Kimura | H04N 23/6811 |
| 2021/0149152 A1 | 5/2021 | Kasahara et al. | |

FOREIGN PATENT DOCUMENTS

| | | |
|---|---|---|
| CN | 111190262 | 5/2020 |
| CN | 211348824 | 8/2020 |
| CN | 211577539 | 9/2020 |
| WO | 2021158033 | 8/2021 |

OTHER PUBLICATIONS

Liu, Chien-Sheng, et al., "Miniature Auto-Focusing Voice Coil Motor Actuator with Excellent Shock Resistance," Advanced Science Letters, vol. 8, 2012, pp. 83-88.

* cited by examiner

*Primary Examiner* — Joel W Fosselman
(74) *Attorney, Agent, or Firm* — Aikin & Gallant, LLP

(57) ABSTRACT

A camera including a camera enclosure; a fixed optics portion having a prism fixedly coupled to the camera enclosure by a voice coil motor base; a moving sensor portion having an image sensor package coupled to the camera enclosure by a voice coil motor carrier that extends around the image sensor package and is operable to cause a displacement of the image sensor package relative to the fixed optics portion; and a damper coupled to the fixed optics portion or the moving sensor portion to absorb an impact between the fixed optics portion and the moving sensor portion.

20 Claims, 7 Drawing Sheets

SHOCK LIMITERS AND DAMPERS FOR IMPROVED CAMERA RELIABILITY

FIELD

An aspect of the disclosure is directed to a camera voice coil motor actuator having shock limiters and/or dampers for improved camera reliability. Other aspects are also described and claimed.

BACKGROUND

The use of small portable multipurpose devices such as smartphones and tablet or pad devices has resulted in a need for high-resolution, small form factor or miniature cameras for integration in the devices. Some of these cameras may incorporate optical image stabilization (OIS) mechanisms that may sense and react to external excitation/disturbance by adjusting a location of the optical lens on the X and/or Y axis in an attempt to compensate for unwanted motion of the lens. In addition, the cameras may incorporate an autofocus (AF) mechanism whereby the object focal distance is adjusted to allow objects at different distances to be in sharp focus and captured by the digital image sensor. In some such autofocus mechanisms, the optical lens is moved relative to the digital image sensor along the optical axis of the camera to refocus the camera. Due to the small form factor of the cameras, however, unintended movements, which may occur when the device is dropped, can cause camera components to collide and become damaged resulting in reduced camera reliability.

SUMMARY

In one aspect, the disclosure is directed to shock or displacement limiters for voice coil motor actuators of a camera assembly to prevent damage to components such as the image sensor. Representatively, the camera assembly disclosed herein may include an image sensor assembly that moves while the optical components remain fixed. The image sensor assembly, however, is made up of a number of relatively brittle sensor components (e.g., cover glass, sensor chip, capacitors, etc.). Thus, a shock or drop event may cause the image sensor assembly to contact one or more of the fixed optical components and damage (e.g., crack) the brittle sensor components or otherwise decrease reliability of the image sensor. The shock limiters are therefore configured to prevent, or otherwise minimize the load of, collisions between sensor components and the fixed components and/or reduce acceleration of the sensor components so as to reduce the risk of cracking. In still further aspects, dampers may be coupled to the fixed or moving components to absorb the inertial loads between the moving and fixed components during a shock event, and in turn, reduce accelerations and fracture risks of the sensor and/or optics components.

Representatively, in one aspect, the disclosure is directed to a camera enclosure; an optomechanical assembly fixedly coupled to the camera enclosure; a sensor assembly having an image sensor and an electronic component mounted to a substrate that is movably coupled to the camera enclosure; a voice coil motor having a base coupled to the optomechanical assembly and a carrier coupled to the sensor assembly that is operable to cause a displacement of the sensor assembly relative to the optomechanical assembly; and a displacement limiter coupled to the base or the carrier to limit an unintended displacement of the sensor assembly. In some aspects, the displacement limiter includes a tab coupled to the carrier. In some aspects, the tab includes a height dimension that is greater than that of the electronic component mounted to the substrate. In some aspects, the electronic component is a capacitor and the height dimension is at least 1.5 times that of the capacitor. In some aspects, the tab includes a length dimension that extends between the electronic component and another electronic component mounted to the substrate. In some aspects, the tab is a first tab coupled to a first side of the carrier, and the displacement limiter comprises a second tab coupled to a second side of the carrier and a third tab coupled to a third side of the carrier. In some aspects, the displacement limiter includes a cantilever having a first end attached to the carrier and a second end that hovers over the substrate. In some aspects, the displacement limiter includes a resilient material coupled to the substrate and surrounding the electronic component. In some aspects, the resilient material includes a foam or an epoxy. In some aspects, the base includes a lead frame having a first portion coupled to the base and a second portion perpendicular to the first portion and coupled to the prism, and the displacement limiter comprises an end of the second portion and the base extending beyond the prism. In some aspects, the end extends along at least three sides of the base such that the displacement limiter limits the displacement of the sensor assembly along at least three sides.

In another aspect, the disclosure is directed to a device including a camera enclosure; a fixed portion having a lens and a prism fixedly coupled to the camera enclosure; a movable portion having an image sensor and a capacitor mounted to a substrate that is movably coupled to the camera enclosure; an actuator having a base coupled to the fixed portion and a carrier coupled to the movable portion that is operable to cause a displacement of the movable portion relative to the fixed portion; and a displacement limiter coupled to the base or the carrier to limit an unintended displacement of the movable portion during a shock event. In another aspect, the actuator includes a voice coil motor actuator. In another aspect, the displacement limiter includes a protrusion coupled to a surface of the carrier facing the fixed portion. In another aspect, the protrusion includes a height dimension that is greater than that of the capacitor mounted to the substrate. In some aspects, the height dimension is at least 1.5 times that of the capacitor. In some aspects, the protrusion includes a length dimension that extends between the capacitor and another capacitor mounted to the substrate. In some aspects, the displacement limiter includes a cantilever having a first end attached to the carrier and a second end that hovers over the substrate. In some aspects, the displacement limiter includes a resilient material coupled to the substrate and surrounding the capacitor. In some aspects, the base includes a lead frame having a first portion coupled to the base and a second portion perpendicular to the first portion and coupled to the prism, and the displacement limiter includes an end of the second portion and the base extending beyond the prism.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments are illustrated by way of example and not by way of limitation in the figures of the accompanying drawings in which like references indicate similar elements. It should be noted that references to "an" or "one" embodiment in this disclosure are not necessarily to the same embodiment, and they mean at least one.

DETAILED DESCRIPTION

In this section we shall explain several preferred aspects of the disclosure with reference to the appended drawings. Whenever the shapes, relative positions and other aspects of the parts described in the aspects are not clearly defined, the scope of the disclosure is not limited only to the parts shown, which are meant merely for the purpose of illustration. Also, while numerous details are set forth, it is understood that some aspects of the disclosure may be practiced without these details. In other instances, well-known structures and techniques have not been shown in detail so as not to obscure the understanding of this description.

The terminology used herein is for the purpose of describing particular aspects only and is not intended to be limiting of the disclosure. Spatially relative terms, such as "beneath", "below", "lower", "above", "upper", and the like may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein interpreted accordingly.

As used herein, the singular forms "a", "an", and "the" are intended to include the plural forms as well, unless the context indicates otherwise. It will be further understood that the terms "comprises" and/or "comprising" specify the presence of stated features, steps, operations, elements, and/or components, but do not preclude the presence or addition of one or more other features, steps, operations, elements, components, and/or groups thereof.

The terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Figures 1, 2:
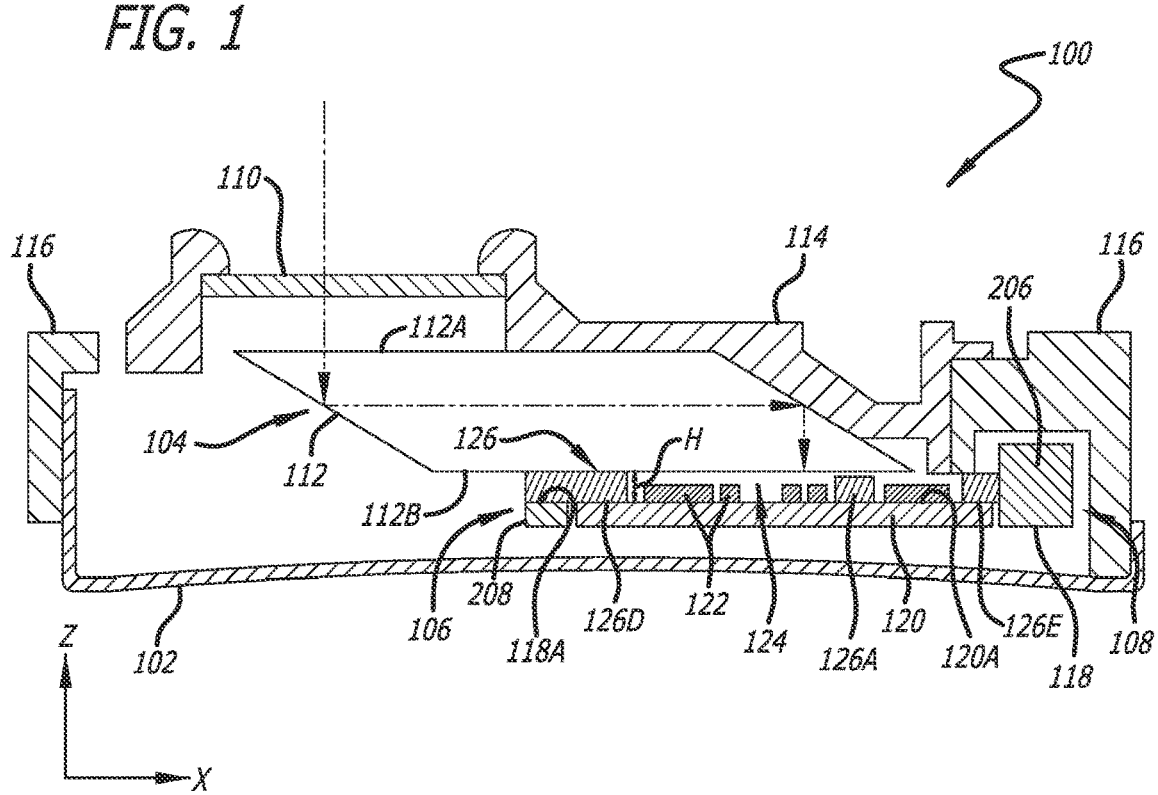
FIG. 1 illustrates a cross-sectional side view of an example camera assembly.
FIG. 2 illustrates a top plan view of some aspects of the camera assembly of FIG. 1.

FIG. 1 illustrates a cross-sectional side view of a camera assembly or module within which any one or more of the aspects disclosed herein, alone or in combination, may be implemented. FIG. 2 illustrates a top plan view of some of the aspects of the camera assembly or module of FIG. 1. The example X-Y-Z coordinate system shown in FIG. 1 and FIG. 2 may be used to discuss aspects of the system and/or system components, and may apply to aspects described throughout the disclosure. Camera assembly 100 may include a camera housing or enclosure 102 having a wall that defines an enclosed space or chamber within which various components of the camera assembly are positioned or otherwise contained. Representatively, the various camera components may be positioned within the enclosed space and fixedly or movably connected to the enclosure 102. For example, the camera components may include an optomechanical assembly 104 including a number of optics components that are contained or otherwise coupled to the enclosure 102. The camera components may further include a sensor assembly 106 including a number of sensing components that are contained or otherwise coupled to the enclosure 102. The camera components may further include an actuator 108 that is operable to move the sensor assembly 106 relative to the optomechanical assembly 104 and/or enclosure 102 to provide OIS and/or AF functionality. Representatively, in some aspects, the optomechanical assembly 104 may be fixedly connected to the enclosure 102 by the actuator 108. The sensor assembly 106 may be movably connected to the enclosure 102 by actuator 108. The actuator 108 may be operable to move the sensor assembly 106 relative to the fixed optomechanical assembly 104 and enclosure 102 to provide the OIS and/or AF functionality. In this aspect, in some cases, the optomechanical assembly 104 and/or its associated components may be considered a fixed portion of the camera 100 while the sensor assembly 106 and/or its associated components may be considered a moving portion of the camera 100.

Referring now in more detail to the optomechanical assembly 104, optomechanical assembly 104 may include a lens 110 (or lens group), a prism 112 and a support structure 114 that holds lens 110 in the desired arrangement relative to prism 112. For example, support structure 114 may hold lens 110 and prism 112 in an arrangement in which lens 110 is positioned above prism 112, and prism 112 is positioned above imaging assembly 104 (e.g., relative to the Z-axis). Lens 110 (or lens group) may include one or more lens elements having an optical axis (e.g., the Z-axis) along which the light entering the camera propagates and is directed toward prism 112. For example, as shown by the arrow, the light may enter an object side 112A of prism 112 (e.g., along the Z-axis) and be redirected along an optical path through prism 112 (e.g., along the X-axis) and out the image side 112B of prism 112 towards the imaging assembly 106 (e.g., along the Z-axis). Optomechanical assembly 104 may be fixedly connected to the camera enclosure 102 by actuator 108 as previously discussed.

Representatively, actuator 108 may, in some aspects, be a voice coil motor (VCM) actuator assembly or module including a base portion 116 and a carrier portion 118. Base portion 116 may be fixedly connected to the optomechanical assembly 104 and camera enclosure 102. For example, base portion 116 may be a substantial rigid structure (e.g., a plastic structure) that defines a periphery within which optomechanical assembly 104 is disposed. Representatively, base portion 116 may have multiple sides that surround and attach to the sides of optomechanical assembly 104. For example, one or more of the side walls of fixed base portion 116 may be attached to support structure 114 as shown in FIG. 1 to fixedly connect optomechanical assembly 104 to camera enclosure 102. Carrier portion 118 may be movably connected to the base portion 116 and camera enclosure 102. Carrier portion 118 may be moved relative to camera enclosure 102 and/or base portion 116 by actuating components (e.g., magnets and/or coils) of actuator 108.

Sensor assembly 106 may be movably connected to camera enclosure 102 by the movable carrier portion 118. Representatively, sensor assembly 106 may be an image sensor package including a substrate 120 having an imaging sensing portion (e.g., an image sensor chip) and electronic components 122 (e.g., capacitors, low-dropout regulators (LDOs), etc.) along a side or top surface 120A of substrate 120 facing prism 112. The movable carrier portion 118 may be connected to substrate 120 and used to shift the sensor assembly 106 relative to optomechanical assembly 104 along multiple axes, e.g., to provide AF and/or OIS functionality. For example, carrier portion 118 may be a substantially rigid structure (e.g., a plastic structure) that defines a periphery within which sensor assembly 106 is disposed. Representatively, as can be seen from the top plan view of FIG. 2, in which optomechanical assembly 104 is removed to simplify the discussion, carrier portion 118 may have a first side 202, a second side 204, a third side 206, and a fourth side 208. The first side 202 and the second side 204 may be lateral sides extending parallel to the X-axis and along opposite side surfaces of sensor assembly 106. The third side 206 and fourth side 208 may be lateral sides extending parallel to the Y-axis and along opposite sides surfaces of sensor assembly 106. In some aspects, although not shown in this view, at least some portion of the sides 202, 204, 206, 208 may be positioned below, and aligned with, at least some portion of the fixed optomechanical assembly 104 and/or other fixed components. For example, as can be seen from FIG. 1, at least a portion of the third side 206 may be below, and aligned with (along the Z-axis), the carrier base portion 116 and at least a portion of the fourth side 208 may be positioned below, and aligned with (along the Z-axis), the image side 112B of prism 112.

During an AF and/or OIS operation, movable carrier portion 118 may displace or shift sensor assembly 106 relative to optomechanical assembly 104 (and camera enclosure 102). For example, carrier portion 118 may displace or shift sensor assembly 106 in a direction parallel to the Z-axis, X-axis and/or Y-axis. To accommodate such movements, various tolerances (e.g, gaps and spaces) are built into the assembly so that actuator 108 can move sensor assembly 106 as intended or desired (e.g., an AF stroke along the Z-axis) without unintended or undesirable impacts or collisions between the various components. For example, there is a gap or space 124 between sensor assembly 106 and prism 112 (e.g., in a Z-axis direction) which is tuned to allow for intended AF and/or OIS movements of sensor assembly 106 without collisions. In some aspects, the gap or space 124 may be tuned to allow a full AF stroke movement toward/away from prism 112 (e.g., in a direction parallel to the Z-axis) without any unintended contact between the movable sensor assembly 106 and the fixed prism 112. Due to sensor assembly 106, however, being movable, as opposed to fixed, and the low tolerances and/or spacing between components, it may be susceptible to unintended or undesirable movements that could potentially result in unintended or undesirable impacts or collisions between components. Unintended or undesirable movements or displacements refer to movements other than those that occur for AF or OIS functionality. For example, an unintended movement or displacement may be due to a drop, high impact or other shock event that occurs when a user drops their device. Such unintended movements or displacements could, in turn, result in unintended impacts and/or collisions between components. These types of high impact events may overpower the stop mechanism of the actuator 108 (e.g., a magnet or mechanical stopper) allowing sensor assembly 106 to shift along the Z-axis a greater distance than the gap or space 124 tolerance allows for. This, in turn, could cause sensor assembly 106 to collide with the image side 112B of prism 112, or another fixed component. For example, a drop or shock event could cause an unintended or undesirable movement of image sensor assembly 106 in which it moves toward and ultimately contacts the image side 112B of prism 112. Image sensor assembly 106 is particularly sensitive to such collisions, however, because it includes a number of brittle components (e.g., cover glass, image sensor chip, electrical traces, capacitors, etc.) that may crack or otherwise be damaged. For example, capacitors 122 on the side or top surface 120A of substrate 120 facing prism 112 may crack or otherwise be damaged (or vice versa) if they come into contact with prism 112.

To prevent or minimize the impact of such a collision or unintended movement or displacement, a shock or displacement limiter 126 is further provided. Shock or displacement limiter 126 may, in some aspects, be a protruding or tab like structure that is connected to, or otherwise extends from, carrier portion 118 of actuator 108 as shown. The protruding or tab like structure may have a shape and/or dimension suitable for preventing components of sensor assembly 106 from contacting prism 112 during a shock or other high impact event. Representatively, in one aspect, limiter 126 may be a structure that protrudes from a surface of carrier portion 118 facing prism 112. For example, limiter 126 may extend above a top surface 118A of at least one of the sides 202, 204, 206, 208 of carrier portion 118 that surround sensor assembly 106. In some aspects, limiter 126 may therefore be understood as a structure that increases a height or thickness of carrier portion 118 beyond that of a conventional VCM carrier. For example, in some aspects, limiter 126 may be molded from a same plastic material as the carrier portion 118 such that they are a single unit, but with an increased height or thickness in certain portions. In other aspects, limiter 126 may be formed separately and attached to the desired area of carrier portion 118.

Referring now in more detail to the dimensions of limiter 126, in some aspects, limiter 126 may have a thickness or height dimension (e.g., a dimension along the Z-axis) that is greater than any of the sensing components mounted to top surface 120A of substrate 120. For example, limiter 126 may have a height dimension (H) that is at least 1.5 times a height of the electronic components 122. In this aspect, if a shock event were to cause an unintended displacement of sensor assembly 106 toward prism 112 (along the Z-axis), limiter 126 would contact image side 112B of prism 112 and limit (or stop) the displacement to prevent any contact between electronic components 122 and prism 112 as shown. In addition, limiter 126 may be arranged at specific locations around sensor assembly 106 that are selected to prevent contact between sensor assembly 106 (e.g., electronic components 122) and other fixed portions above sensor assembly 106. For example, it can be seen from FIG. 1, which is a cross-sectional view along line A-A of FIG. 2, that the portions 126A and 126D of limiter 126 are arranged at locations of carrier portion 208 directly below prism 112. Portions 126A and 126D therefore contact prism 112 before electronic components 122 to prevent prism 112 from directly contacting and possibly damaging electronic components 122. In addition, a portion 126E of limiter 126 arranged at carrier side 206 is positioned below base portion 116 of actuator 108. This portion of limiter 126 therefore contacts base portion 116 to prevent prism 112 (or the base portion 116) from directly contacting and possibly damaging electronic components 122 or other sensor assembly components.

In addition to the height dimension (H), limiter 126 may have a length dimension (L) that can be seen from the top plan view of FIG. 2. Representatively, the length dimension (L) may be understood as the dimension of limiter 126 extending from one or more of carrier sides 202, 204, 206, 208 in a direction of the image sensor portion 210 of sensor assembly 106. For example, length dimension (L) may run parallel to the X-axis or the Y-axis depending on which of the carrier sides 202, 204, 206, 208 it extends from. In this aspect, the limiter or tab portions 126A, 126B, 126C, 126D of limiter 126 may be understood as extending over, or otherwise overlapping, the top surface 120A of substrate 120. Some of portions 126A-D may therefore be directly between substrate 120 and the prism 112. Limiter portions 126A-D should not, however, overlap, or otherwise be positioned over, the image sensor portion 210.

In addition, limiter portions 126A-D may be arranged so that they extend between adjacent electronic components 122. For example, limiter portion 126A may be connected to carrier side 202 and extend between electronic components 122A and 122B. Limiter portion 126B may be connected to carrier side 206 and extend between electronic components 122B and 122C. Limiter portion 126C may be connected to carrier side 204 and extend between electronic components 122C and 122D. Limiter portion 126D may be connected to carrier side 208 and extend between electronic components 122A and 122D. In this aspect, limiter 126 may be understood as having an arrangement in which at least one tab or portion 126A-D is positioned between each adjacent electronic component 122A-D. Said another way, limiter 126 may have a tab or portion 126A-D located at each of carrier sides 202, 204, 206, 208 so that at least one tab or portion 126A-D is between each of the adjacent electronic components 122A-D. In this aspect, portions 126A-D may have any length dimension (L) that allows portions 126A-D to extend between adjacent electronic components 122A-D without overlapping sensing portion 210. Each of tab or portions 126A-D may have a different or a same size and shape (e.g., same height dimension (11) and/or length dimension (L)). For example, in one aspect, tab or portions 126A-C may have a same size and shape (e.g., same height dimension (H) and length dimension (L)) while tab or portion 126D has a different size and shape (e.g., different height dimension (H) and/or length dimension (L)). In addition, in some aspects, portion 126D may have a width dimension (W) that is greater than portions 126A-C such that it extends along a larger portion of carrier side 208 than the other portions 126A-C.

In addition, it can further be seen from this view that limiter 126 can have a frame like portion 126E that extends around (or overlaps) almost an entire perimeter of sensor assembly 106. For example, the portion 126E of limiter 126 extending around the perimeter (e.g., connected to carrier sides 202, 206, 208 and 210) could also be considered to have the previously discussed height dimension (H) that is greater than the components mounted to the substrate 120. In this aspect, since portion 126E of limiter 126 extends almost entirely around sensing portion 210 and portions 126A-D are positioned between capacitors 122A-D, any surfaces or structures not directly aligned with a limiter portion 126A-E will also be prevented from colliding (e.g., due to deflection or buckling) with sensing portion 210 and/or capacitors 122A-D.

Figure 3:
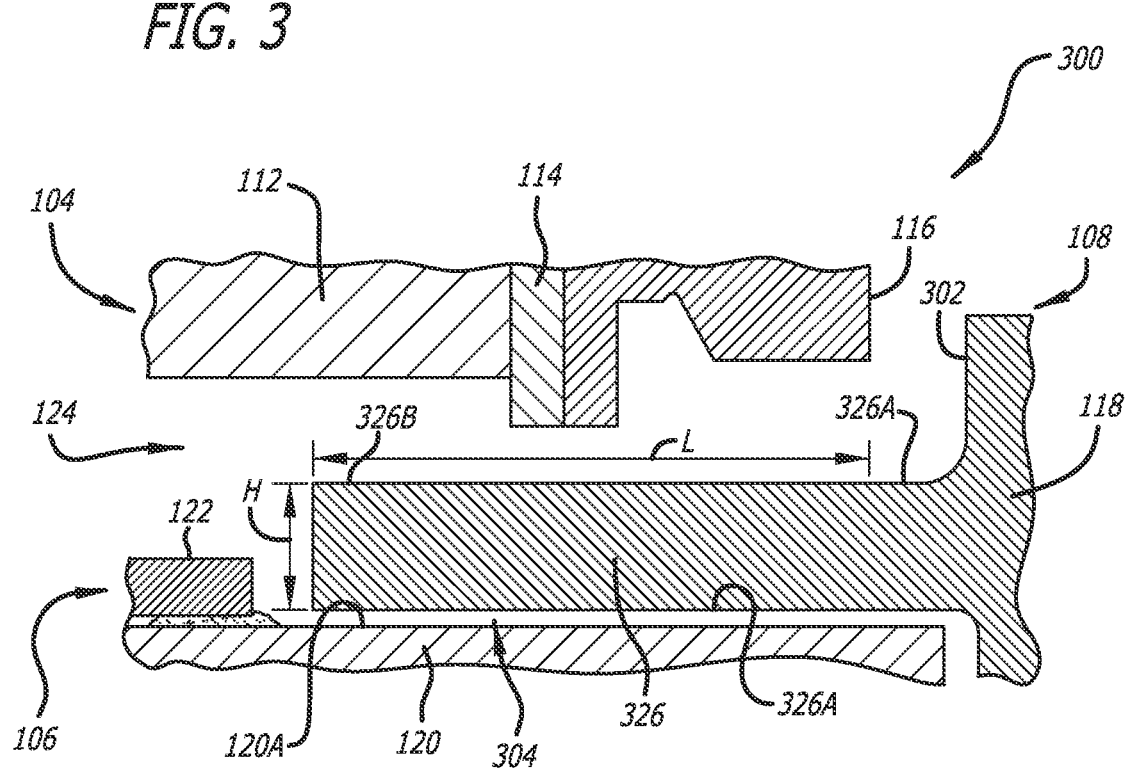
FIG. 3 illustrates a magnified cross-sectional side view of an aspect of a camera assembly.

Referring now to FIG. 3, FIG. 3 illustrates a magnified cross-sectional side view of another aspect of a camera assembly similar to that of FIGS. 1-2. Representatively, FIG. 3 illustrates a magnified view of an alternative structure for a shock or displacement limiter similar to displacement limiter 126 previously discussed in reference to FIGS. 1-2. In particular, although not all shown, the camera assembly 300 of FIG. 3 may include each of the camera components previously discussed in reference to FIGS. 1-2. For example, camera assembly 300 may include optomechanical assembly 104 and sensor assembly 106. Optomechanical assembly 104 may include prism 112 along with the other previously discussed optics components (although not shown) attached to base portion 116 of actuator 108 by support structure 114. Sensor assembly 106 may include substrate 120, electronic component 122 (e.g., a capacitor), and any of the other previously discussed sensing components (although not shown). Sensor assembly 106 may be movably attached to camera enclosure by carrier portion 118 of actuator 108 as previously discussed.

Camera assembly 300 may further include a shock or displacement limiter 326 connected to carrier portion 118 of actuator 108. Shock or displacement limiter 326 may have a similar size and shape as limiter 126 previously discussed in reference to FIGS. 1-2. Representatively, displacement limiter 326 may extend from one or more of the sides of carrier portion 118 and have a size and shape selected to prevent a collision between the moving sensor assembly 106 and the fixed optomechanical assembly 104. For example, displacement limiter 326 may have a height dimension (H) that is greater than a height dimension of the electronic component 122 and/or a length dimension (L) that extends between adjacent electronic components 122 as previously discussed.

Figure 4:
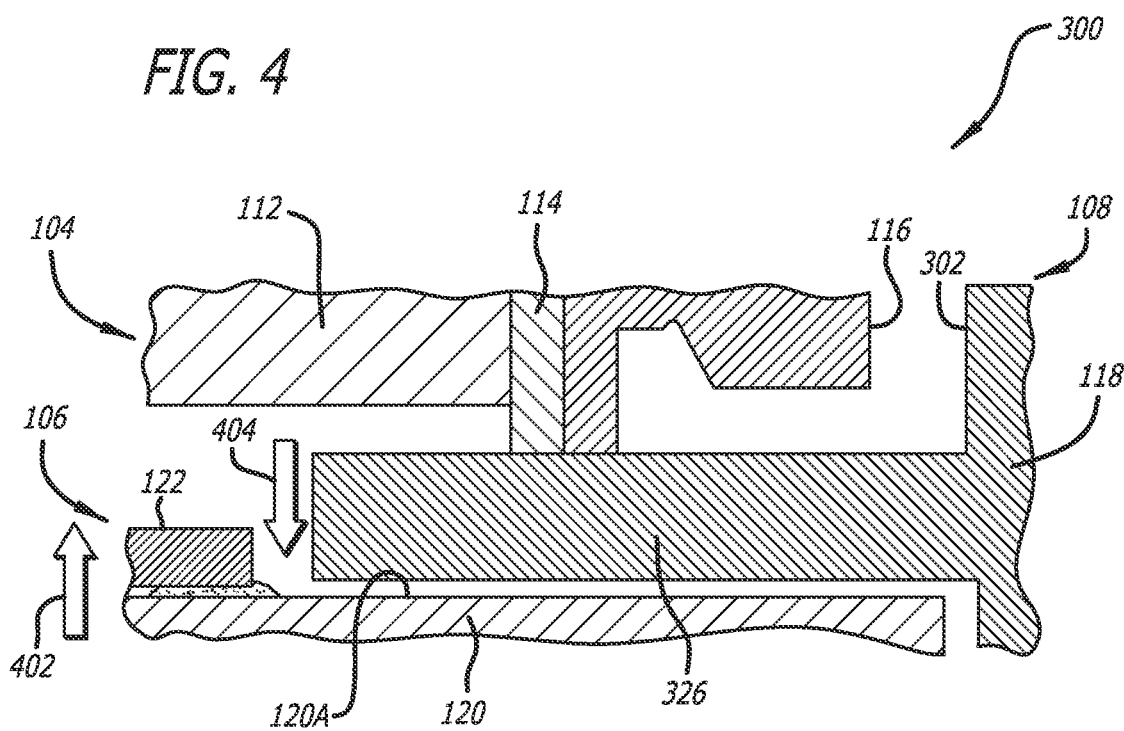
FIG. 4 illustrates a magnified cross-sectional side view of an aspect of the camera assembly of FIG. 3.

In this configuration, however, displacement limiter 326 is cantilevered to reduce accelerations and provide additional shock absorption to any colliding components. Representatively, displacement limiter 326 may have a first end 326A that is connected to a sidewall 302 of carrier portion 118 of actuator 108. Limiter 326 may extend from the first end 326A to a second end 326B. Second end 326B may be considered a free end in that it is not attached to a support structure. Limiter 326 may extend over substrate 120 such that the free end 326B hovers, or is otherwise suspended over, substrate 120 as shown. There may be a gap or space 304 between limiter 326 and substrate 120 such that limiter 326 does not directly contact substrate 120. Representatively, the bottom surface 326A of limiter 326 may be spaced a distance from the top surface 120A of substrate 120 to form the gap or space 304. In this aspect, limiter 326 operates as a cantilever and can deflect upon impact to take the load away from the more brittle sensor components of sensor assembly 106. For example, in the cases of an unintended shock event, sensor assembly 106 may move toward the fixed camera portion including optomechanical assembly 104 and base portion 116 of actuator 108 as shown by arrow 402 in FIG. 4. Limiter 326, however, is cantilevered therefore upon contact with the fixed base portion 116, limiter 326 can swing or deflect in a downward direction as illustrated by arrow 404 and operate like an energy absorber to absorb some of the contact load. Since limiter 326 is not in direct contact with sensor assembly 106, the energy is not transferred to sensor assembly 106. In some aspects, it is further contemplated that the size of the gap or space 304 may be tuned to allow for more or less deflection (and/or shock absorption) of limiter 326 as needed. For example, where a greater degree of deflection of limiter 326 is desired (e.g., to absorb higher impact or shock events), a size of gap or space 304 may be increased. On the other hand, where less deflection of limiter 326 is desired (e.g., to absorb lower impact or shock events), a size of gap or space 304 may be decreased. It is further contemplated that other aspects of limiter 326 may also be tuned to achieve a desired deflection (e.g., the limiter height, length or material).

Figure 5:
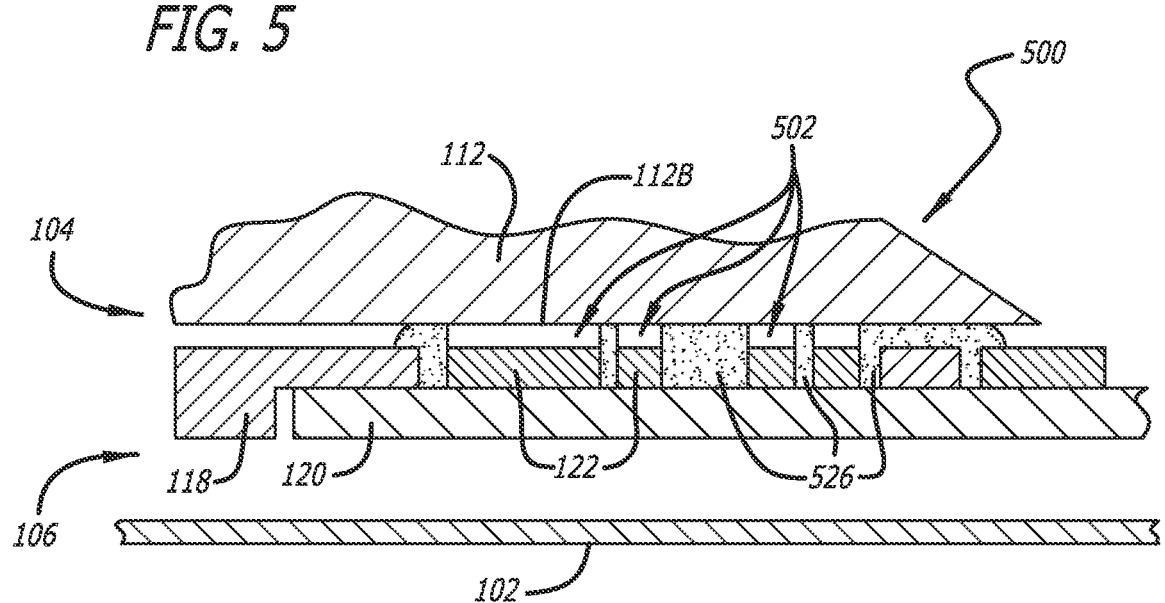
FIG. 5 illustrates a magnified cross-sectional side view of an aspect of a camera assembly.

Referring now to FIG. 5, FIG. 5 illustrates a cross-sectional side view of another aspect of a camera assembly similar to that of FIGS. 1-4. Representatively, FIG. 5 illustrates an alternative structure for a shock or displacement limiter previously discussed in reference to FIGS. 1-4. In particular, although not all shown, the camera assembly 500 of FIG. 5 may include each of the camera components previously discussed in reference to FIGS. 1-4. For example, camera assembly 500 may include optomechanical assembly 104 and sensor assembly 106. Optomechanical assembly 104 may include prism 112 along with the other previously discussed optics components (although not shown) and be fixedly attached to the camera enclosure by a base portion of the actuator (not shown). Sensor assembly 106 may include substrate 120, electronic components 122 (e.g., a capacitors), and any of the other previously discussed sensing components (although not shown). Sensor assembly 106 may be movably attached to camera enclosure 102 by carrier portion 118 of the actuator (e.g., a VCM actuator).

A shock or displacement limiter 526 is further shown connected to carrier portion 118 of the actuator. Similar to the previously discussed displacement limiters, displacement limiter 526 may have a shape and/or dimension suitable for preventing the movable sensing components of sensor assembly 106 from colliding with the fixed optics components of optomechanical assembly 104 during a drop, shock or other high impact event. In this aspect, however, limiter 526 is a conformal structure, for example a foam material, that is applied to, formed on, or otherwise attached to, substrate 120. For example, limiter 526 may be a punched foam material that is applied to the top surface 120A of substrate 120. Limiter 526 may further have openings 502 that are arranged to accommodate electrical components 122. For example, openings 502 may be punched into the foam material at locations corresponding to the position of each of electronic components 122 mounted to substrate 120. In addition, openings 502 may, in some aspects, correspond to a shape of electronic components 122. In this aspect, when the punched foam limiter 526 is applied to substrate 120, electronic components 122 are positioned within openings 502 and entirely surrounded by the foam.

Similar to the previously discussed limiters, foam limiter 526 may have a thickness or height dimension greater than the electronic components 122. For example, foam limiter 526 may have a height dimension that prevents a direct contact (e.g., a collision) between electronic components 122 or any other components of sensor assembly 106 that could damage sensor assembly 106 during a shock event. Thus, upon impact with prism 112 during a shock event, foam limiter 526 may compress and absorb the contact load instead of electronic components 122. In some aspects, the foam limiter 526 may be applied to the entire top surface 120A of substrate 120 such that portions of foam limiter 526 are between all the adjacent electronic components 122. It is further contemplated, however, that in other aspects, foam limiter 526 covers less than the entire surface 120A. In this aspect, some adjacent electronic components 122 may not have foam in between them but the height dimension of foam limiter 526 spaces prism 112 a great enough distance away from sensor assembly 106 to prevent contact with the remaining electronic components 122 and other sensing components of sensor assembly 106. It should further be understood that while a foam material is described as used to form limiter 526, it is contemplated that any compressible or resilient material suitable for absorbing a contact load between sensor assembly 106 and optomechanical assembly 104 during a contact event may be used. For example, limiter 526 could be made from another type of resilient material such as an elastomer or other rubber-like material.

Figure 6:
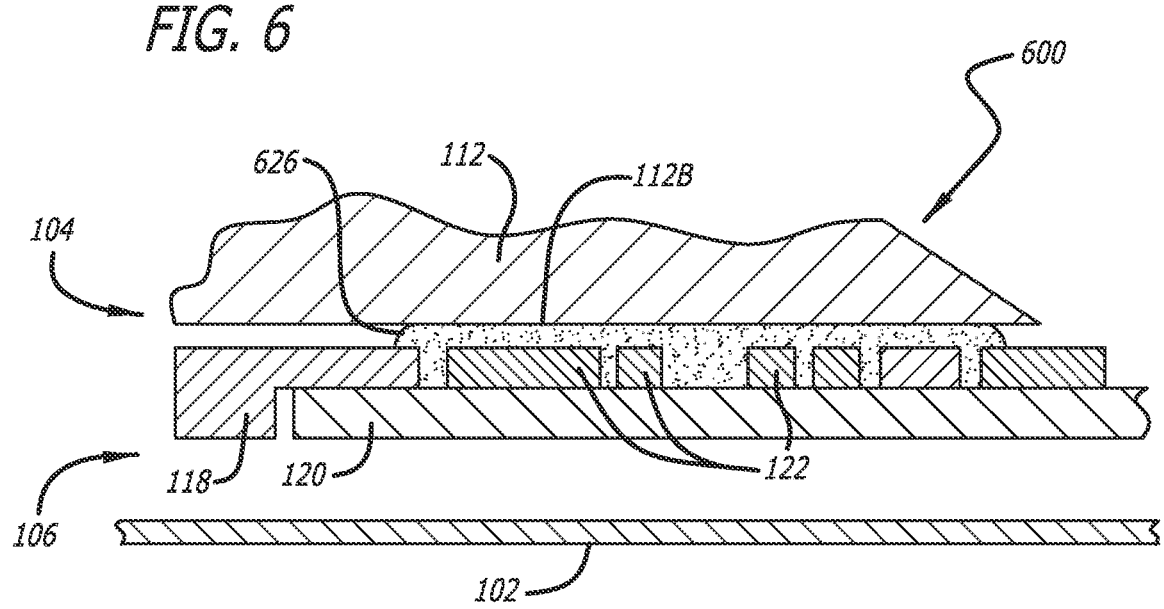
FIG. 6 illustrates a magnified cross-sectional side view of an aspect of a camera assembly.

Referring now to FIG. 6, FIG. 6 illustrates a cross-sectional side view of another aspect of a camera assembly similar to that of FIGS. 1-5. Representatively, FIG. 6 illustrates an alternative structure for a shock or displacement limiter previously discussed in reference to FIGS. 1-5. In particular, although not all shown, the camera assembly 600 of FIG. 6 may include each of the camera components previously discussed in reference to FIGS. 1-5. For example, camera assembly 600 may include optomechanical assembly 104 and sensor assembly 106. Optomechanical assembly 104 may include prism 112 along with the other previously discussed optics components (although not shown) and be fixedly attached to the camera enclosure by a base portion of the actuator (not shown). Sensor assembly 106 may include substrate 120, electronic components 122 (e.g., capacitors), and any of the other previously discussed sensing components (although not shown). Sensor assembly 106 may be movably attached to camera enclosure 102 by carrier portion 118 of the actuator (e.g., a VCM actuator).

A shock or displacement limiter 626 is further shown connected to carrier portion 118 of the actuator. Similar to the previously discussed displacement limiters, displacement limiter 626 may have a shape and/or dimension suitable for preventing the movable sensing components of sensor assembly 106 from colliding with the fixed optics components of optomechanical assembly 104 during a drop, shock or other high impact event. In this aspect, however, limiter 626 is a conformal coating that can be applied to substrate 120 and conform to the shape of the sensor assembly components to protect them from collision. For example, limiter 626 may be formed by an epoxy material that is applied to top surface 120A of substrate 120 and over (and/or around) electronic components 122. Similar to the previously discussed limiters, limiter 626 may have a thickness or height dimension greater than the electronic components 122. Thus, upon impact with prism 112 during a shock event, the epoxy material forming limiter 626 will compress and absorb the contact load instead of electronic components 122. In this aspect, direct contact (e.g., a collision) between electronic components 122 or any other components of sensor assembly 106 that could damage sensor assembly 106 during a shock event is prevented. In some aspects, limiter 626 may be applied to the entire top surface 120A of substrate 120 and around electronic components 122 such that the epoxy material is between all the adjacent electronic components 122. In addition, the epoxy material may be applied over all the electronic components 122 such that they are completed encased within the material. It is further contemplated, however, that in other aspects, limiter 626 may cover less than the entire surface 120A and/or electronic components 122. In this aspect, some adjacent electronic components 122 may not have epoxy in between or over them but the thickness or height dimension of limiter 626 spaces prism 112 a great enough distance away from sensor assembly 106 to prevent contact with the remaining electronic components 122 and other sensing components of sensor assembly 106. It should further be understood that while an epoxy material is described as used to form limiter 626, it is contemplated that any compressible or resilient material suitable for providing a conformal type coating over the brittle sensor components and absorbing a contact load between sensor assembly 106 and optomechanical assembly 104 during a contact event may be used.

Figure 7:
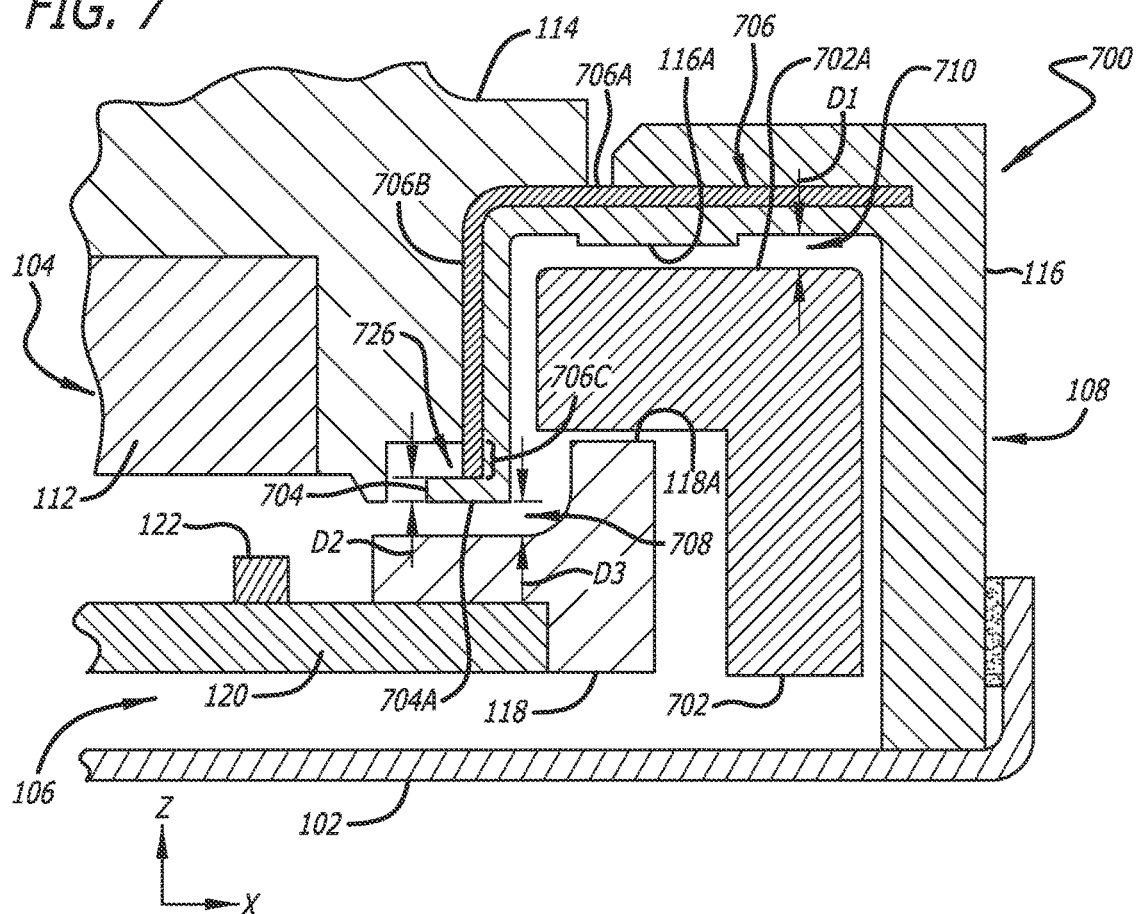
FIG. 7 illustrates a magnified cross-sectional side view of an aspect of a camera assembly.

Referring now to FIG. 7, FIG. 7 illustrates a cross-sectional side view of another aspect of a camera assembly similar to that of FIGS. 1-6. Representatively, FIG. 7 illustrates an alternative structure for a shock or displacement limiter previously discussed in reference to FIGS. 1-6. In particular, although not all shown, the camera assembly 700 of FIG. 7 may include each of the camera components previously discussed in reference to FIGS. 1-6. For example, camera assembly 700 may include optomechanical assembly 104 and sensor assembly 106. Optomechanical assembly 104 may include prism 112 and support structure 114 fixedly coupling prism 112 to base portion 116 of actuator 108 (e.g., a VCM actuator). Base portion 116 may be fixedly coupled to camera enclosure 102. Sensor assembly 106 may include substrate 120, electronic component 122 (e.g., capacitor), and any of the other previously discussed sensing components (although not shown). Sensor assembly 106 may be movably attached to camera enclosure 102 by carrier portion 118 of actuator 108 (e.g., a VCM actuator).

A shock or displacement limiter 726 is further shown connected to carrier portion 118 of the actuator 108. Similar to the previously discussed displacement limiters, displacement limiter 726 may have a shape and/or dimension suitable for preventing the movable sensing components of sensor assembly 106 from colliding with the fixed optics components of optomechanical assembly 104 during a drop, shock or other high impact event. In this aspect, however, limiter 726 is formed by extended end portions 704, 706C of base portion 116 and lead frame 706, respectively. Representatively, base portion 116 may include a lead frame 706 which runs through base portion 116 to provide reinforcement. For example, in some aspects, where base portion 116 is a plastic structure, lead frame 706 may be a metal structure that runs through base portion 116 to reinforce the plastic structure. The metal material of lead frame 706 may provide the additional advantage of being a more adhesive surface than plastic for attaching the support structure 114 of prism 112 to base portion 116. Lead fame 706 may include a first portion 706A that runs in a direction parallel to the X-axis and is embedded within, or otherwise attached to, a top portion of base portion 116. Lead frame 706 may further include a second portion 706B that extends perpendicular to first portion 706B in a direction toward sensor assembly 106 (e.g., parallel to the Z-axis). In this aspect, second portion 706B runs along the side of prism 112 and support structure 114. Support structure 114 can therefore be attached (e.g., adhered) to second portion 706B to fixedly connect prism 112 to base portion 116 as shown.

Limiter 726 may be formed at the end of second portion 706B facing sensor assembly 106 so that during a drop or shock event, it can prevent direct contact between components of sensor assembly 106 and prism 112. For example, limiter 726 may be configured to limit the travel of the carrier portion 116 connected to sensor assembly 106 to reduce accelerations on the sensor components. This, in turn, leads to reduced stresses and REL risk (e.g., fracture and/or cracking). Representatively, limiter 726 may be formed by an extended end portion 706C of lead frame 706 and an extended end portion 704 of base portion 116. For example, the end portion 706C of lead frame 706 may be extended (e.g., in a Z-axis direction) so that it terminates at least level with, or below (e.g., closer to sensor assembly 106), prism 112 as shown. Base portion 116 may further include an extended end portion 704 that extends below end portion 706C. For example, in some aspects, extended end portion 704 may have an "L" or other similar cross-sectional shape as shown such that it extends under end portion 706C of lead frame 706 and increases the surface area. For example, the surface area or width of extended end portion 704 may be greater than lead frame end portion 706C so that the surface area for absorbing an impact during a shock event is maximized. In addition, although not shown in this view, it should be understood that the lead frame 706 may be positioned within at least three sides of the base portion 116. For example, lead frame 706 may be positioned within at least three sides of the base portion 116 surrounding optomechanical assembly 104. Limiter 726 may therefore further be positioned along at least three sides of the base portion 116. In this aspect, limiter 726 may contact at least three sides of the carrier portion 118 surrounding image sensing assembly 106 (or any moving portion) during a drop or shock event for maximum absorption of the shock event.

In addition, certain aspects of limiter 726 may be tuned to limit displacement and reduce acceleration of the sensor assembly. For example, the base end portion 704 may extend below lead frame end portion 706C a distance (D2) (e.g., in a Z-axis direction). Representatively, in some aspects, extended end portion 704 may extend a distance (D2) such that it terminates below prism 112 (e.g., closer to sensor assembly 106 than prism 112). A gap or space 708 having a distance (D3) is further formed between the bottom surface 704A of end portion 704 and the top surface 118A of carrier portion 118 as shown. Distance (D3) of the gap or space 708 may be tuned or selected to allow for a certain amount of displacement or movement of the moving sensor components before contact is made with limiter 726 to prevent collision. For example, the distance (D3) of gap or space 708 may be tuned to minimize an impact between components. Representatively, reducing the size of the gap or space 708 may reduce the acceleration and/or impact between limiter 726 and carrier portion 118 during a drop event.

Figure 8:
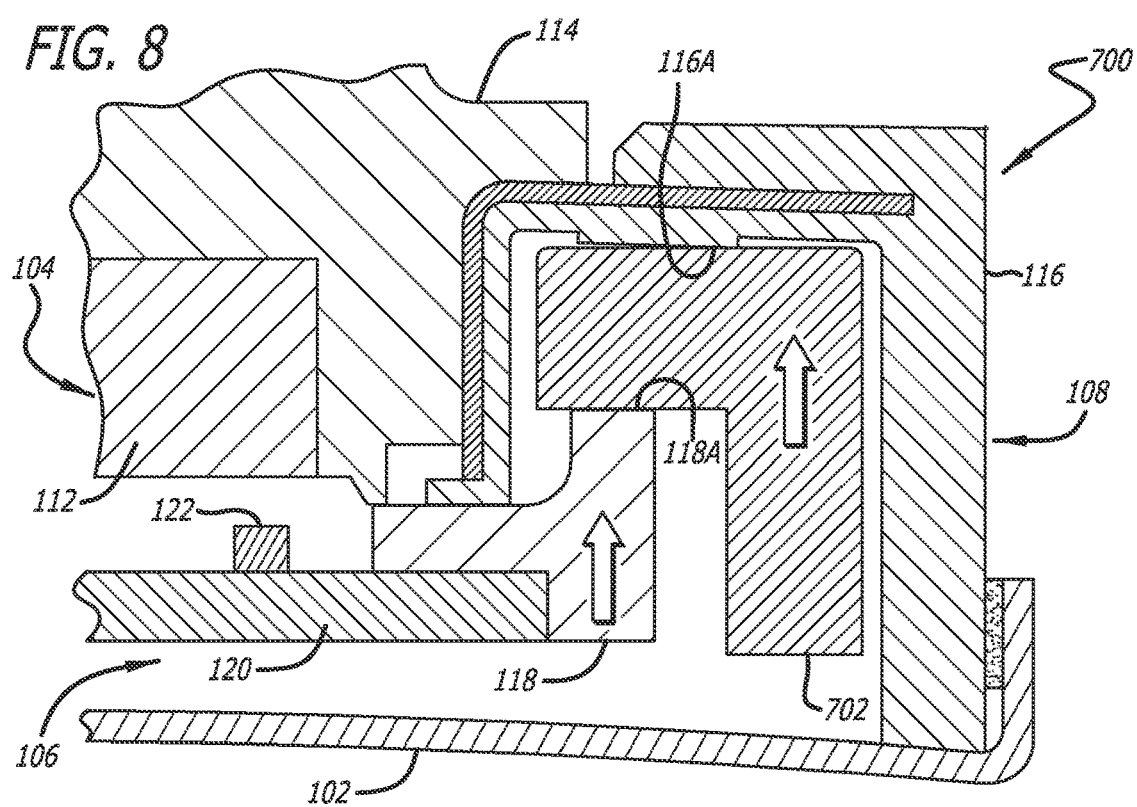
FIG. 8 illustrates a magnified cross-sectional side view of an aspect of the camera assembly of FIG. 7.

Representatively, referring now to FIG. 8, FIG. 8 illustrates limiter 726 limiting an excursion of the moving portion to prevent a collision between the moving sensor components and the fixed prism during a shock event. For example, as can be seen from FIG. 8, during a shock event, carrier portion 118 coupled to sensor assembly 106 may be caused to move toward the fixed base portion 116 as illustrated by the arrow. Limiter 726 extends below prism 112 to contact and stop the upward movement of carrier portion 118 at a point or position where there is still a gap or space maintained between the sensor components (e.g., electronic component 122) and optics components (e.g., prism 112). This, in turn, prevents any direct contact between sensor components (e.g., electronic component 122) and the fixed optics components (e.g., prism 112). Limiting the travel of the carrier portion 118 in this manner further reduces accelerations on the sensor components. In addition, as previously discussed, although a contact at one of the sides of carrier portion 118 is shown in FIG. 8, it should be understood that limiter 726 may be arranged along at least 3 sides, or four sides, of the base portion 116 and therefore absorb a contact along at least three, or four, sides of carrier portion 118.

In some aspects, limiter 726 may further be tuned to limit an impact in combination with a stroke limiter of the camera assembly. For example, camera 700 may include a stroke limiter or limiting mechanism that stops the movement of carrier portion 118 at the end of the AF stroke. Representatively, to achieve a full AF stroke needed for an AF function, the actuating components of actuator 108 may move carrier portion 118 a certain predetermined distance in the Z-axis direction (illustrated by the arrow). The stroke limiting mechanism is designed to stop this AF movement of the carrier portion 118 at the end of the AF stroke. For example, in some aspects, actuator 108 may include an internal assembly or structure 702 that hard stacks to base portion 116 and is positioned between base portion 118 and carrier portion 118. As can be seen from FIG. 7, in a resting or non-actuated state, there is a space or gap 710 between the top surface 702A of structure 702 and the bottom surface 116A of base portion 116. The space or gap 710 may have a distance (D1). During an AF stroke, carrier portion 118 is caused to move in the direction of the arrow (e.g., toward surface 116A of base portion 116). The top surface 702A of structure 702 also moves and contacts surface 116A of base portion 116. This contact serves as the main or primary end stop or AF limiter for the movement of carrier portion 118 during the AF stroke. Once this primary contact is made to end the AF stroke, however, other components associated with carrier portion 118 may still deflect or otherwise continue to move (e.g., during a shock event). For example, the moving components (e.g., sensor assembly and carrier portion) have a large inertial mass, so after the initial contact stopping the AF stroke, the sensor assembly 106, and particularly the middle components may deflect and continue to move upward due to inertia. Any collision with sensor components due to the deflection or continued movement after the primary contact to end the AF stroke may be prevented by limiter 726. Thus, in some aspects, the distance (D1) of the space or gap 710 between base portion 116 and structure 702 may be tuned with the distance (D3) of the space of gap 708 between limiter 726 and carrier 118 so that both the primary and secondary contacts can occur as desired, while still preventing an undesirable collision. For example, in some aspects, to ensure that contact with the AF stroke limiter (e.g., contact with surface 116A of base portion 116) occurs first to stop the AF stroke, distance (D1) of gap 710 and/or distance (D3) gap 708 are tuned to be large enough to achieve a full AF stroke (e.g., slightly larger than the AF stroke) but minimized and optimized to be as small as possible to maximize the shock limiter function of limiter 726. In this aspect, limiter 726 is critical for limiting contact at beneficial and prescribed locations that may not otherwise be achieved with the AF limiting mechanism (e.g., contact between structure 702 and base portion 116).

Figure 9:
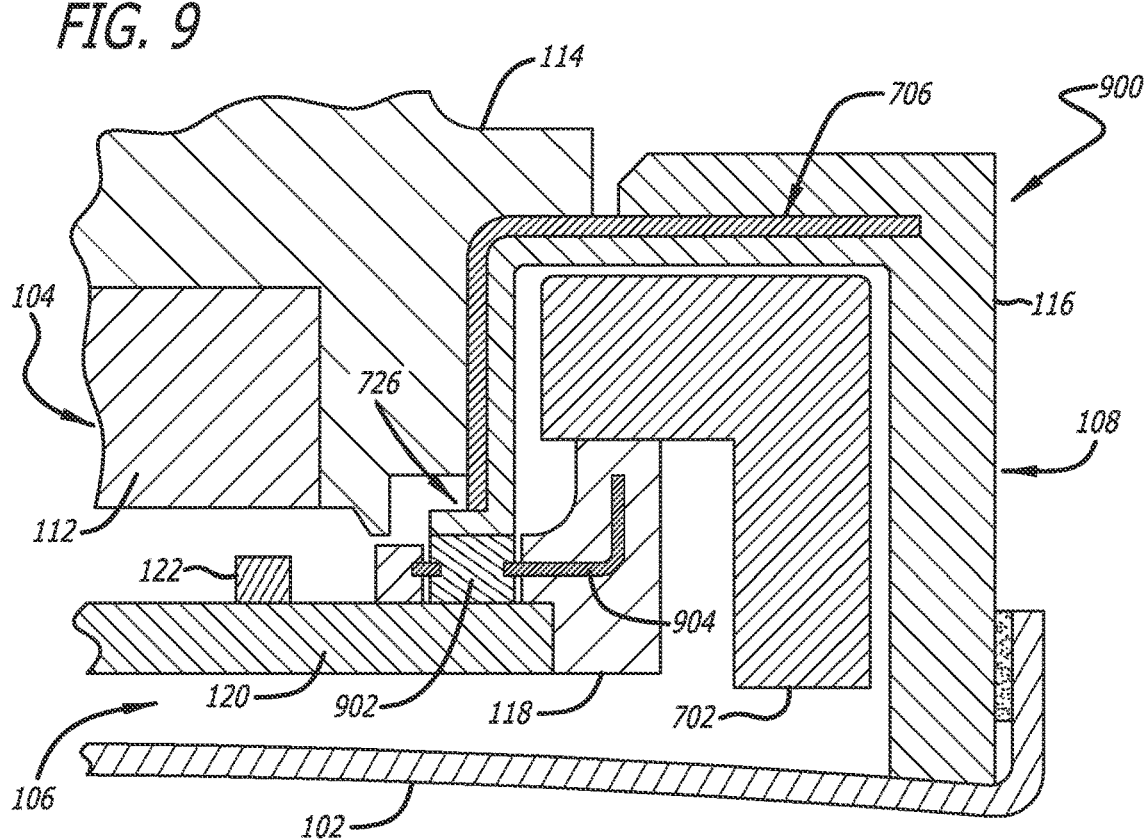
FIG. 9 illustrates a magnified cross-sectional side view of an aspect of a camera assembly.

Referring now to FIGS. 9-12, FIGS. 9-12 illustrate dampers which can be incorporated into any of the previously discussed camera assemblies to absorb the inertial loads between the moving and fixed components during a shock event, and in turn, reduce accelerations and fracture risks of the sensor and/or optics components. Representatively, referring now in more detail to FIG. 9, FIG. 9 illustrates a cross-sectional side view of a camera assembly 900 similar to that discussed in FIGS. 1-8. Representatively, similar to the previously discussed camera assemblies, camera assembly 900 may include optomechanical assembly 104 and sensor assembly 106. Optomechanical assembly 104 may include prism 112 and support structure 114 fixedly coupling prism 112 to base portion 116 of actuator 108 (e.g., a VCM actuator). Base portion 116 may be fixedly coupled to camera enclosure 102. Sensor assembly 106 may include substrate 120, electronic component 122 (e.g., capacitor), and any of the other previously discussed sensing components (although not shown). Sensor assembly 106 may be movably attached to camera enclosure 102 by carrier portion 118 of actuator 108 (e.g., a VCM actuator). In addition, camera assembly 900 may have a shock limiter 726 similar to that previously discussed in reference to FIGS. 7-8. It should be understood, however, that although limiter 726 from FIGS. 7-8 is shown, the assembly may include any one or more of the other previously discussed shock limiters 126, 326, 526 or 626 in addition to or instead of limiter 726.

Camera 900 further includes a damper 902 configured to absorb the inertial loads between the moving and fixed components during a shock event, and in turn, reduce accelerations and fracture risks of the sensor and/or optics components. Damper 902 may be attached to carrier portion 118 of actuator 108. Damper 902 may be attached to carrier portion 118 at a location that is aligned with limiter 726. In this aspect, limiter 726 will directly contact damper 902, instead of the surface of carrier portion 118, during a shock or other similar high impact event as previously discussed. Damper 902 may be made of any material suitable for reducing the load or stresses between components that would otherwise contact one another and have high acceleration. Representatively, in some aspects, damper 902 may be made of an elastomeric material such as a rubber. For example, in some aspects, damper 902 may be overmolded to the plastic material forming carrier portion 118. In addition, in some aspects, carrier portion 118 may further include an optional lead frame 904 for added support, and damper 902 may further be overmolded or otherwise attached to lead frame 904 as shown. Damper 902 may be overmolded to carrier portion 118 at a location or position that is below limiter 726. It is further contemplated that although damper 902 is described as being overmolded to carrier portion 118 and lead frame 904, any suitable attachment mechanism (e.g., an adhesive) or assembly process may be used to attach damper 902 to carrier portion 118. For example, damper 902 could instead be glued into the desired area of carrier portion 118 with or without lead fame 904. In addition, although damper 902 is shown only at one side or portion of carrier portion 118, it is contemplated that any number of dampers 902 may be included in any side or portion of carrier portion 118 that could impact a fixed portion and therefore benefit from a reduced load at the point of impact.

Figure 10:
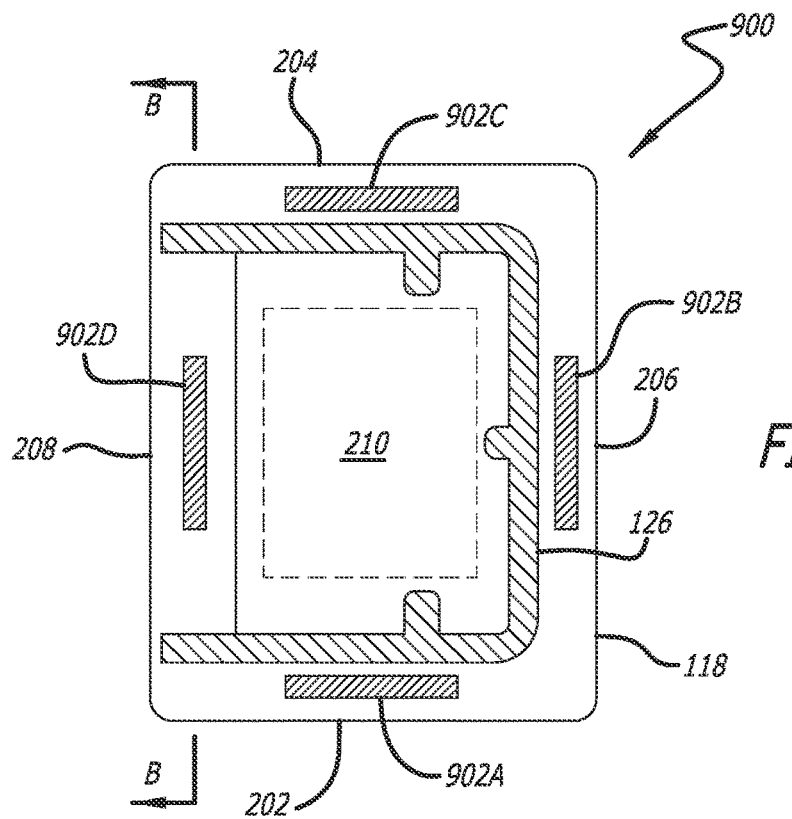
FIG. 10 illustrates a top plan view of some aspects of the camera assembly of FIG. 9.

Representatively, as can be seen from FIG. 10, which is a top plan view of the carrier portion 118 of FIG. 9, dampers 902A, 902B, 902C and 902D may be included in one or more of carrier sides 202, 206, 204, 208, respectively. In this aspect, dampers 902A, 902B, 902C, 902D may absorb a contact with limiter 726, which as previously discussed may also be included along one or more sides of the base portion 116. For example, in some aspects, where carrier sides 202, 204 and 206 are aligned with sides of the base portion including limiters 726, dampers 902A, 902B, 902C may be included along carrier sides 202, 204 and 206 to absorb the impact between the limiters 726 and carrier portion 118. In addition, in some aspects, carrier side 208 may be aligned with prism 112 as previously discussed. In this aspect, damper 902D may be configured to absorb an impact of the prism 112, instead of one of limiters 726 or the base portion 116.

Figure 11:
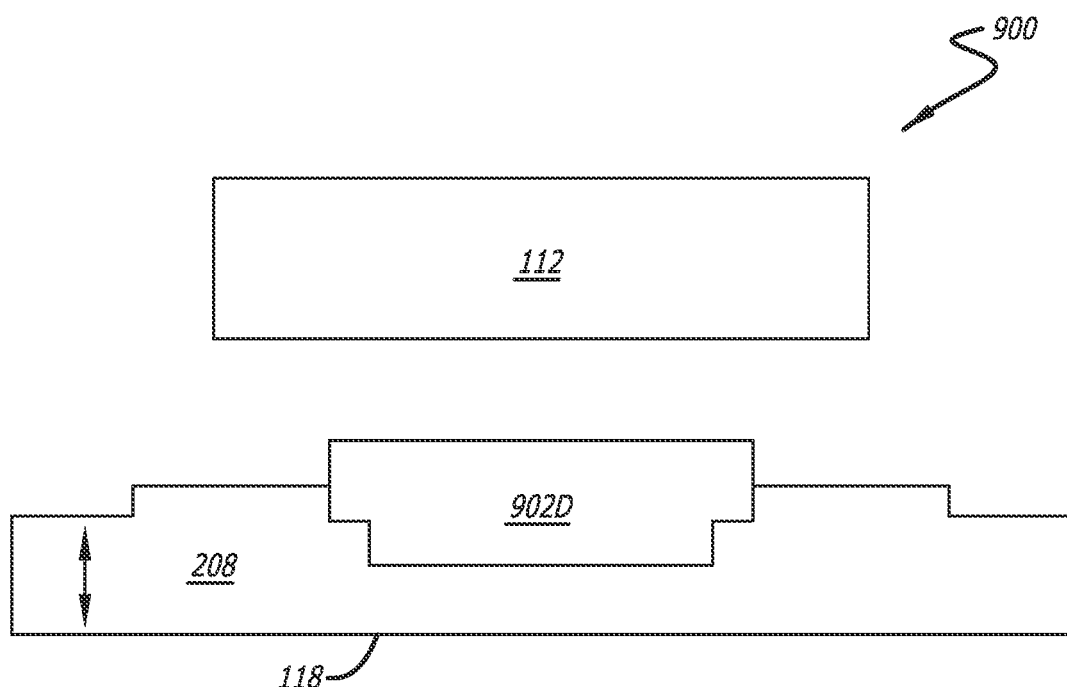
FIG. 11 illustrates a cross-sectional side view along line B-B of FIG. 10 of some aspects of the camera assembly of FIG. 9.

Representatively, FIG. 11 illustrates a cross-sectional side view along line B-B through side 208 of carrier portion 118. From this view, it can be seen that carrier side 208 and damper 902D are aligned with prism 112, instead of a limiter 726 attached to base portion 118. In this aspect, damper 902D contacts prism 112 when carrier 118 is moved toward prism 112 during a shock or other high impact event (as illustrated by the arrow) to disperse the load and protect the sensor and optics components from damage during the impact.

Figure 12:
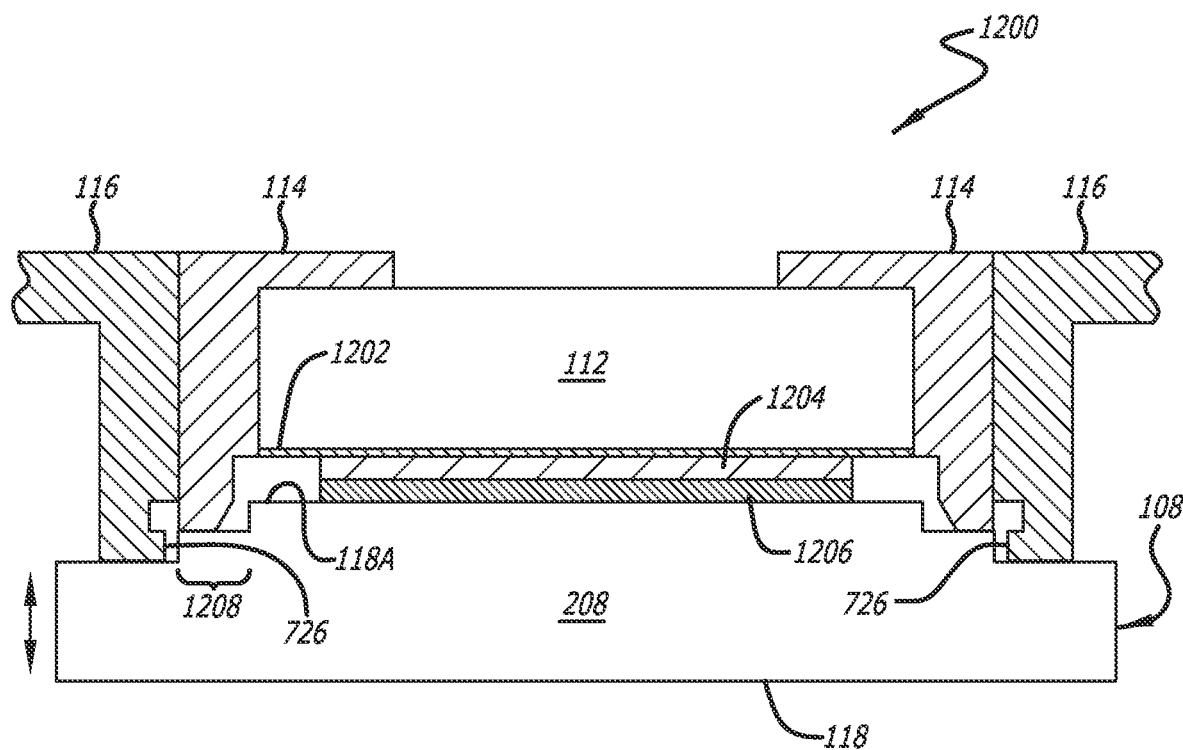
FIG. 12 illustrates a cross-sectional side view of some aspects of a camera assembly.

Referring now in more detail to FIG. 12, FIG. 12 illustrates a cross-sectional side view of an alternative damper configuration. The cross-sectional side view of FIG. 12 may also be along line B-B through the carrier side 208 as shown in FIG. 10. Representatively, similar to the previously discussed camera assemblies, camera assembly 1200 may include optomechanical assembly 104 and sensor assembly 106. Optomechanical assembly 104 may include prism 112 and support structure 114 fixedly coupling prism 112 to base portion 116 of actuator 108 (e.g., a VCM actuator). Base portion 116 may be fixedly coupled to a camera enclosure as previously discussed (e.g., camera enclosure 102). In addition, although now shown in this view, camera assembly 1200 may include sensor assembly 106 having a substrate 120, electronic component 122 (e.g., capacitor), and any of the other previously discussed sensing components (although not shown). Sensor assembly 106 may be movably attached to camera enclosure 102 by carrier portion 118 of actuator 108 (e.g., a VCM actuator).

As can be seen in this configuration, however, instead of attaching a damper to the side of carrier portion 118 below prism 112 as previously discussed in reference to FIGS. 9-11, damper 1206 may be attached to prism 112. In particular, damper 1206 may be attached to the side or surface of prism 112 that interfaces with a top side or surface 118A of carrier side 208. Damper 1206 may provide the same benefits or advantages as the previously discussed damper 902 attached to the carrier portion 118. For example, similar to the previously discussed damper, damper 1206 may provide the advantages of protecting the prism during contact and absorbing a shock load. Attaching damper 1206, however, to prism 112 instead of carrier portion 118 allows for the surface area of carrier portion 118, that would otherwise be occupied by the damper, to be used for other purposes. For example, when the damper is overmolded or otherwise attached to carrier portion 118, it occupies areas of carrier portion 118 that can no longer be used to attach other components. Therefore, in some aspects, it may be desirable to attach damper 1206 to prism 112 so that the surface area of carrier portion 118 is maintained for other uses. In addition, attaching damper 1206 to prism 112 may help to protect a surface coating and/or other optical components attached to prism 112.

Representatively, as can be seen from FIG. 12, the side of prism 112 interfacing with carrier portion 118 may include a coating 1202. Coating 1202 may be, for example, a powder coating (e.g., a physical or chemical vapor deposition coating) that is applied to the active area of prism 112. This side of prism 112 may further include an optical layer 1204 applied over coating 1202. Optical layer 1204 may, for example, be a carbon coated layer of plastic (e.g., 20 microns thick) that is adhered to the prism 112. Optical layer 1204 may prevent light rays from escaping and returning back to prism 112 and causing flair. Damper 1206 may then be formed by a layer of damping material applied over the optical layer 1204. For example, damper 1206 may be formed by a pressure sensitive adhesive (PSA) or any other soft damping material that is applied to the optical layer 1204. In this aspect, when the carrier side 208 of carrier portion 118 moves in the direction of the arrow, the carrier surface 118A contacts the damper 1206 instead of the prism 112. This, in turn, reduces the risk of fracture or cracking of the prism 112 or sensor assembly components during a camera shock event.

In addition, attaching damper 1206 to the prism 112 may have the added advantage of allowing for greater clearance or system tolerances during an inadvertent horizontal or shifting movement of the components. For example, as can be seen from FIG. 12, carrier portion 118 may include a step-down region 1208. Step down region 1208 is specially designed to have a horizontal clearance or distance between the step down and the limiter 726 attached to base portion 116 so that when carrier portion 118 moves horizontally, there is no contact at the step-down region 1208. In this aspect, attaching damper 1206 to prism 112 as described allows for greater contact area without having to modify the step-down region 1208 to avoid collisions due to shifting or other horizontal movements.

Figure 13:
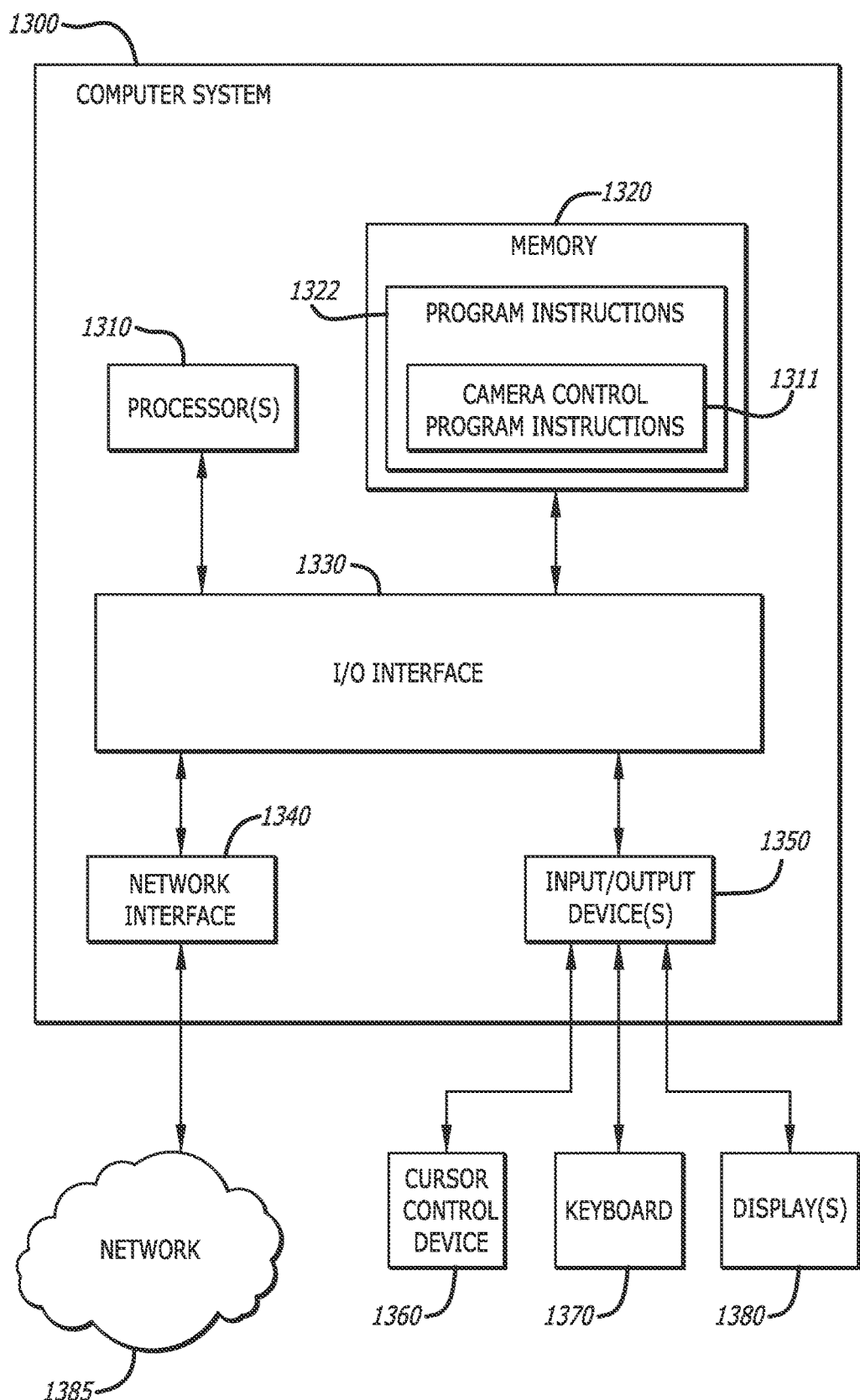
FIG. 13 illustrates an example computer system that may include a camera assembly as disclosed herein.

Referring now to FIG. 13, FIG. 13 illustrates an example computer system that may include a camera, in accordance with aspects disclosed herein. Representatively, FIG. 13 illustrates an example computer system 1300 that may include one or multiple features, components, and/or functionality of the aspects described herein with reference to FIGS. 1-12. The computer system 1300 may be configured to execute any or all of the aspects described herein. In some aspects, computer system 1300 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various aspects of a camera system as described herein, including aspects for actuating the camera system using a voice coil motor, as described herein may be executed in one or more computer systems 1300, which may interact with various other devices. Note that any component, action, or functionality described above with respect to FIGS. 1-12 may be implemented on one or more computers configured as computer system 1300 of FIG. 13. Representatively, computer system 1300 may include one or more processors 1310 coupled to a system memory 1320 via an input/output (I/O) interface 1330. Computer system 1300 may further include a network interface 1340 coupled to I/O interface 1330, and one or more input/output devices 1350, such as cursor control device 1360, keyboard 1370, and display(s) 1380. In some cases, it is contemplated that aspects may be implemented using a single instance of computer system 1300, while in other embodiments multiple such systems, or multiple nodes making up computer system 1300, may be configured to host different portions or instances of aspects disclosed herein. For example, in one aspect, some elements may be implemented via one or more nodes of computer system 1300 that are distinct from those nodes implementing other elements.

In various aspects, computer system 1300 may be a uniprocessor system including one processor 1310, or a multiprocessor system including several processors 1310 (e.g., two, four, eight, or another suitable number). Processors 1310 may be any suitable processor capable of executing instructions. For example, in various aspects, processors 1310 may be general-purpose or embedded processors implementing any of a variety of instruction set architectures (ISAs), such as the x86, PowerPC, SPARC, or MIPS ISAs, or any other suitable ISA. In multiprocessor systems, each of processors 1310 may commonly, but not necessarily, implement the same ISA.

System memory 1320 may be configured to store camera control program instructions 1322 and/or camera control data accessible by processor 1310. In various aspects, system memory 1320 may be implemented using any suitable memory technology, such as static random access memory (SRAM), synchronous dynamic RAM (SDRAM), nonvolatile/Flash-type memory, or any other type of memory. In the illustrated aspect, program instructions 1322 may be configured to implement a lens control application 1324 incorporating any of the functionality described above. Additionally, existing camera control data 1332 of memory 1320 may include any of the information or data structures described above. In some aspects, program instructions and/or data may be received, sent or stored upon different types of computer-accessible media or on similar media separate from system memory 1320 or computer system 1300. While computer system 1300 is described as implementing the functionality of functional blocks of previous Figures, any of the functionality described herein may be implemented via such a computer system.

In one aspect, I/O interface 1330 may be configured to coordinate I/O traffic between processor 1310, system memory 1320, and any peripheral devices in the device, including network interface 1340 or other peripheral interfaces, such as input/output devices 1350. In some embodiments, I/O interface 1330 may perform any necessary protocol, timing or other data transformations to convert data signals from one component (e.g., system memory 1320) into a format suitable for use by another component (e.g., processor 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some aspects, the function of I/O interface 1330 may be split into two or more separate components, such as a north bridge and a south bridge, for example. Also, in some embodiments some or all of the functionality of I/O interface 1330, such as an interface to system memory 1320, may be incorporated directly into processor 1310.

Network interface 1340 may be configured to allow data to be exchanged between computer system 1300 and other devices attached to a network 1385 (e.g., carrier or agent devices) or between nodes of computer system 1300. Network 1385 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1340 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1350 may, in some aspects, include one or more display terminals, keyboards, keypads, touchpads, scanning devices, voice or optical recognition devices, or any other devices suitable for entering or accessing data by one or more computer systems 1300. Multiple input/output devices 1350 may be present in computer system 1300 or may be distributed on various nodes of computer system 1300. In some aspects, similar input/output devices may be separate from computer system 1300 and may interact with one or more nodes of computer system 1300 through a wired or wireless connection, such as over network interface 1340.

As shown in FIG. 13, memory 1320 may include program instructions 1322, which may be processor-executable to implement any element or action described above. In one embodiment, the program instructions may implement the methods described above. In other embodiments, different elements and data may be included. Note that data may include any data or information described above.

Those skilled in the art will appreciate that computer system 1300 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1300 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

While certain aspects have been described and shown in the accompanying drawings, it is to be understood that such embodiments are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting. For example, although the drawings illustrate a combination of aspects and elements, any one or more of the aspects or elements may be optional and/or combined with aspects or elements from other drawings. Representatively, although FIGS. 1-13 illustrate a number of aspects and/or elements together, one or more of the aspects of one or more of FIGS. 1-13 may be optional and omitted from what is shown, or may be combined with aspects from other drawings. In addition, to aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What is claimed is:
1. A camera comprising:
 a camera enclosure;
 a fixed optics portion having a prism fixedly coupled to the camera enclosure by a voice coil motor base;

a moving sensor portion having an image sensor package coupled to the camera enclosure by a voice coil motor carrier that extends around the image sensor package and is operable to cause a displacement of the image sensor package relative to the fixed optics portion; and a damper comprising an elastomeric material fixedly coupled to the prism or the voice coil motor carrier to absorb an impact between the fixed optics portion and the moving sensor portion.

2. The camera of claim 1 wherein the elastomeric material is overmolded to the voice coil motor carrier.

3. The camera of claim 1 wherein the damper is coupled to a side of the voice coil motor carrier that faces the prism.

4. The camera of claim 1 wherein the damper is coupled to a side of the voice coil motor carrier that faces the voice coil motor base.

5. The camera of claim 1 wherein the voice coil motor carrier comprises a first side, a second side, a third side and a fourth side that extend around a perimeter of the image sensor package, and the damper is a first damper coupled to the first side, and the camera further comprises a second damper coupled to the second side of the voice coil motor carrier and a third damper coupled to a third side of the voice coil motor carrier.

6. The camera of claim 1 wherein the damper is coupled to a surface of the prism that faces the moving sensor portion.

7. The camera of claim 1 wherein the elastomeric material is coupled to an image side of the prism that faces the voice coil motor carrier.

8. The camera of claim 7 wherein the image side of the prism comprises a layer of optical material and the elastomeric material comprises a pressure sensitive adhesive coupled to the layer of optical material.

9. The camera of claim 1 wherein the damper is operable to absorb the impact and reduce an acceleration of the moving sensor portion during a shock event.

10. A device comprising:
a camera enclosure;
an optomechanical assembly having a prism fixedly coupled to the camera enclosure;
a sensor assembly having an image sensor and an electronic component mounted to a substrate that is movably coupled to the camera enclosure;
a voice coil motor having a base coupled to the optomechanical assembly and a carrier coupled to the sensor assembly that is operable to cause a displacement of the sensor assembly relative to the optomechanical assembly; and
a damper comprising an elastomeric material fixedly coupled to the prism or the carrier.

11. The device of claim 10 wherein the elastomeric material is overmolded to the carrier.

12. The device of claim 11 wherein the elastomeric material comprises a rubber material.

13. The device of claim 11 wherein the carrier comprises a lead frame and the elastomeric material is coupled to the lead frame.

14. The device of claim 10 wherein the damper is coupled to a side of the carrier that is aligned with the prism.

15. The device of claim 10 wherein the damper is coupled to a side of the carrier that is aligned with the base.

16. The device of claim 10 wherein the carrier comprises a first side, a second side, a third side and a fourth side that extend around a perimeter of the sensor assembly, and the damper is a first damper coupled to the first side, and the device further comprises a second damper coupled to the second side of the carrier and a third damper coupled to a third side of the carrier.

17. The device of claim 10 wherein the damper is coupled to an image side of the prism that faces the carrier.

18. The device of claim 17 wherein the image side of the prism comprises a carbon coated plastic layer and a pressure sensitive adhesive coupled to the carbon coated plastic layer.

19. The device of claim 17 wherein the damper is coupled to less than an entire surface of the image side of the prism that faces the carrier.

20. The device of claim 10 wherein the damper is operable to absorb an impact between the optomechanical assembly and the sensor assembly during a shock event.

* * * * *

UNITED STATES PATENT AND TRADEMARK OFFICE
CERTIFICATE OF CORRECTION

| | |
|---|---|
| PATENT NO. | : 11,936,983 B1 |
| APPLICATION NO. | : 17/951676 |
| DATED | : March 19, 2024 |
| INVENTOR(S) | : Nitin Kumar Chennupati et al. |

It is certified that error appears in the above-identified patent and that said Letters Patent is hereby corrected as shown below:

In the Specification

Column 4,
Lines 56, delete "imaging assembly 104" and insert in place there of --sensor assembly 106--

Column 4,
Lines 56, delete "imaging assembly 106" and insert in place there of --sensor assembly 106--

In the Claims

Column 19,
Line 23, Claim 5, delete ""a third side"" and insert in place there of --the third side--

Column 20,
Line 23, Claim 16, delete ""a third side"" and insert in place there of --the third side--

Signed and Sealed this
Twenty-fifth Day of June, 2024

Katherine Kelly Vidal
*Director of the United States Patent and Trademark Office*